No. 693,711. Patented Feb. 18, 1902.
F. C. HULL.
UMBRELLA STICK.
(Application filed Mar. 20, 1900.)
(No Model.)
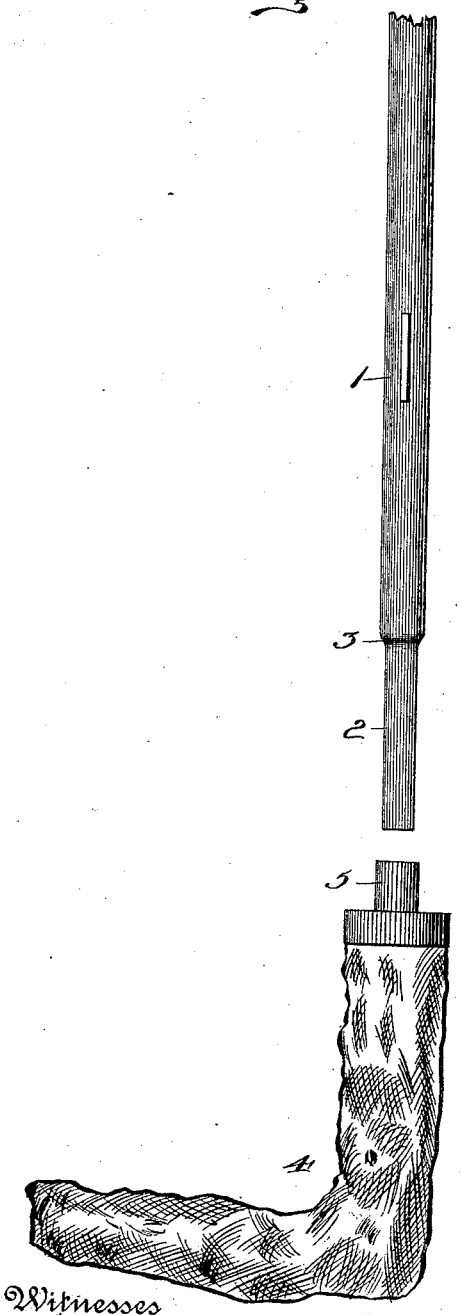
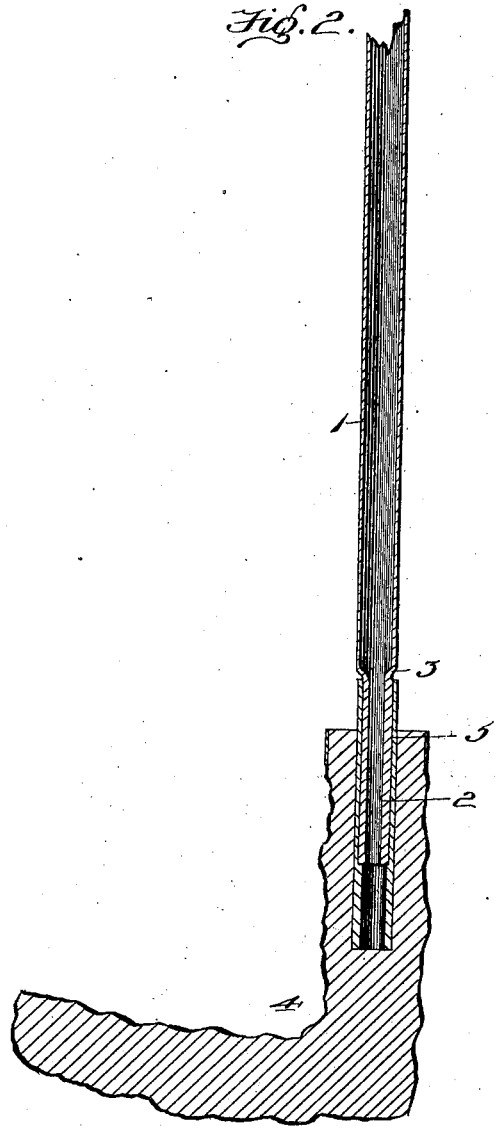
Witnesses
Edwin B. H. Tower, Jr
Margaretta Jackson
Inventor:
Fletcher C. Hull
By:- Edson Bros,
Attorneys.

UNITED STATES PATENT OFFICE.

FLETCHER C. HULL, OF NORWALK, OHIO.

UMBRELLA-STICK.

SPECIFICATION forming part of Letters Patent No. 693,711, dated February 18, 1902.

Application filed March 20, 1900. Serial No. 9,439. (No model.)

*To all whom it may concern:*

Be it known that I, FLETCHER C. HULL, a citizen of the United States, residing at Norwalk, in the county of Huron and State of Ohio, have invented certain new and useful Improvements in Umbrella-Sticks; and I do hereby declare the following to be a full, clear, and exact description of the invention, such as will enable others skilled in the art to which it appertains to make and use the same.

My invention relates to tubular metal sticks for umbrellas, parasols, &c.

The object of my present invention is to provide a metal stick of such construction that it will be interchangeable with different handles.

The sticks of umbrellas, &c., are made of different sizes, which are usually governed by either the size of the umbrella or its price.

My invention consists of a stick having one end thereof reduced and combined with a handle, preferably one that is detachable, in order that handles may be interchangeable on sticks of different sizes, without reference to the cost or size of the umbrella, &c., separate from the handle.

An embodiment of my invention is illustrated in the accompanying drawings, in which—

Figure 1 is a longitudinal view of a stick, its upper end being broken away, and a handle detachable from the stick having a sleeve or socket to receive the reduced end of the stick made in accordance with my invention. Fig. 2 is a longitudinal section through the stick and handle.

Like numerals of reference indicate like parts in both figures.

In the accompanying drawings, in which I have represented the proposed embodiment of my invention, 1 indicates the stick of an umbrella, parasol, &c., made of tubular metal, having the lower end 2 or the end which is attached to the handle reduced at 3, whereby the portion of the stick which enters the handle is reduced in diameter. The walls of the reduced portion may be drawn down to the same thickness as the walls of the body portion of the stick; but I prefer to preserve uniform strength to the stick throughout its length by increasing the thickness of the walls of the reduced portion.

4 is a handle having a sleeve or socket 5 to receive the reduced end 2 of the stick.

My invention can be advantageously employed on umbrellas, &c., having small delicate handles—such as ivory, pearl, &c.—independent of the interchangeable feature thereof, and I would therefore have it understood that I do not confine myself to a construction and combination of parts in which the handle is detachable. When detachable handles are employed, they may be secured to the stick by any of the well-known means suitable for the purpose.

Heretofore in the manufacture of umbrellas, parasols, &c., the diameter of the "stick" has varied more or less according to either the size of the umbrella—twenty-six, twenty-eight, or thirty inches, &c.—or the price thereof—one, two, or five dollars, &c.—the result being that the handles were either permanently attached to the stick or, if detachable therefrom, were made in different sizes to fit the varying sizes of sticks.

My invention enables the manufacturers to make the handles—*i. e.*, the sleeve or socket thereof—of a uniform size, whereby any handle can be attached to any stick. This enables the dealer to adapt his handle to the preference of his customers by placing a high-priced handle on a low-priced top or a high-priced top upon a low-priced handle or to sell two or more assorted handles for use on different occasions or seasons for the same top. My invention also enables a dealer to order a given number of tops, which are staple goods, and a greater or less number of handles, whereby his purchase of handles is limited to the styles which appear to be most popular with his customers without having to invest a larger amount in handles which are found to be unreasonable or which quickly pass out of style.

Having thus fully described my invention, what I claim, and desire to secure by Letters Patent, is—

1. A tubular umbrella-stick of malleable metal, having a lower end extension drawn "down" into a reduced cross-sectional area, in combination with a handle having a socket or sleeve adapted to receive said extension, substantially as set forth.

2. A tubular umbrella-stick having a lower end extension drawn "down" into a reduced cross-sectional area, the walls of said reduced extension being thickened, in combination with a handle having a socket or sleeve adapted to receive said extension, substantially as specified.

3. A tubular umbrella-stick having a lower end extension drawn "down" into a reduced cross-sectional area, in combination with a handle having a sleeve or socket extending beyond said handle and adapted to receive said reduced extension of the umbrella-stick, substantially as set forth.

In testimony whereof I affix my signature in presence of two witnesses.

FLETCHER C. HULL.

Witnesses:
R. P. HULL,
C. D. MILES.